United States Patent [19]

Lamoure

[11] Patent Number: 5,416,312
[45] Date of Patent: May 16, 1995

[54] DOCUMENT BEARING AN IMAGE OR A TEXT AND PROVIDED WITH AN INDEXING FRAME, AND ASSOCIATED DOCUMENT ANALYSIS SYSTEM

[75] Inventor: Jacques Lamoure, Meudon, France

[73] Assignee: Cherloc, La Roche sur Yon, France

[21] Appl. No.: 245,046

[22] Filed: May 17, 1994

Related U.S. Application Data

[63] Continuation-in-part of Ser. No. 979,690, Nov. 20, 1992, Pat. No. 5,329,108.

[30] Foreign Application Priority Data

May 21, 1993 [FR] France ................. 93 06101

[51] Int. Cl.⁶ .............................. G06K 19/06
[52] U.S. Cl. ..................... 235/494; 235/454; 235/472
[58] Field of Search ............. 235/454, 472, 494

[56] References Cited

U.S. PATENT DOCUMENTS 5,329,108 7/1994 Lamoure .................. 235/494

*Primary Examiner*—Harold Pitts
*Attorney, Agent, or Firm*—Nikaido, Marmelstein, Murray & Oram

[57] ABSTRACT

The invention relates to a document bearing an image or a text, broken down into a large number of elementary areas with which are associated respectively a large number of indexes.

According to the invention, each index includes a group of dots (10) placed on the document in the vicinity of the associated elementary area and forming a specific code for the said area, the indexes as a whole forming a location frame covering the said image or the said text and superimposed thereupon, each group of dots being readable by optical reading means cooperating with a data processing system comprising a data medium addressable by means of the said indexes.

11 Claims, 3 Drawing Sheets

*FIG.1* *FIG.2*
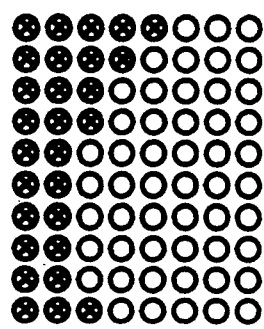
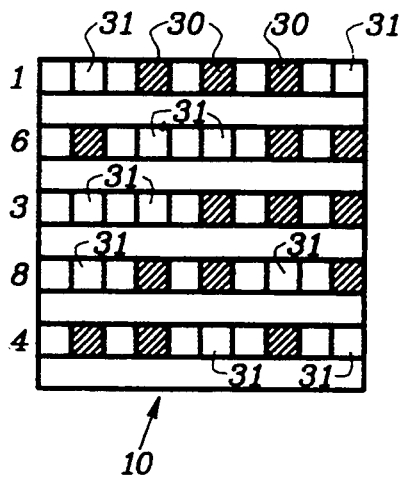
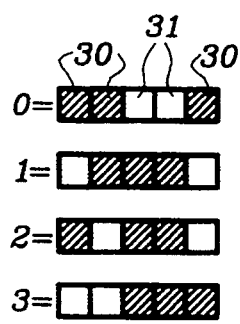
*FIG.3*
*FIG.4*
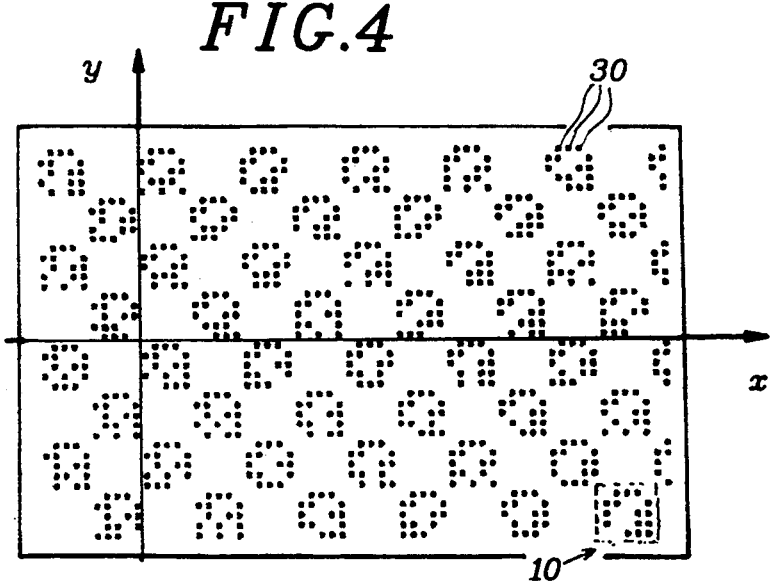

DOCUMENT BEARING AN IMAGE OR A TEXT AND PROVIDED WITH AN INDEXING FRAME, AND ASSOCIATED DOCUMENT ANALYSIS SYSTEM

CROSS REFERENCE TO RELATED APPLICATION

This application is a c-i-p of Ser. No. 07/979,690, Nov. 20, 1992, now U.S. Pat. No. 5,329,108.

BACKGROUND OF THE INVENTION

The invention relates to a document bearing an image or a text, broken down into a large number of elementary areas with which are associated respectively a large number of indexes.

The general purpose of the invention is to provide means for making it possible to associate, with each image portion or with any word in a text, a set of information contained in a computer data base, this information consisting, in particular, of a description of the image portion or of a list of items of information appertaining thereto and, in the case of a word in a text, of pieces of information of a linguistic type or of an educative and literary nature.

The word "image" embraces all sorts of representations of persons, things and sites, obtained using any process, such as painting, drawing, photography or printing. It relates to a single, continuous image covering the whole of the surface of the document, or to an image composed of a number of elementary images forming a whole, or again, to a juxtaposition with one another of independent images.

As regards the problem of arranging a large amount of information on a document, the current situation in the particular field of cartography is described hereinafter.

At the present time, two different approaches are used in cartography, between which there is generally no interpenetration. The older approach, consisting in the use of maps bearing a graphic representation, is still very widely used, both in professional applications and in popular applications. The maps give global information that is directly accessible and familiar to all potential users. They remain easy to handle even when produced in large formats, in the order of one square meter. When they are made using modern printing techniques, which have now been thoroughly mastered, very fine lines can be produced on them: many maps available at low prices are produced using polychromy by superimposing frames, each formed by a matrix of dots with a pitch of 100 $\mu$m or less (down to 25 $\mu$m), and with a dot positioning accuracy of approximately 10 $\mu$m.

Counterbalancing these advantages, the conventional graphic representation type map has certain limitations. In particular, the amount of useful information that can be inscribed on a map without detriment to its legibility is limited. This often leads to the greater part of the information being placed in an appendix. The text and graphic information are generally interlinked by means of a simple squaring system, whereof each square is identified, by means of a letter-figure pair or by a number. Such squaring gives only an approximate indication and, in addition, obliges the user to refer to indications provided in the margins of the map (see document FR-A-2 639 452).

The data processing approach to geographical representation has essentially consisted, hitherto, in defining an image, dot by dot, in the form of a table, in a memory. Even if use is made of representational algorithms in a simplified form, the necessary information takes up very large volumes of memory, which can amount to as much as several hundreds of millions of bytes for a single map. In addition, existing visual display devices are very far from offering the same degree of resolution as the conventional graphic maps. A professional quality high resolution monitor displays an image in the form of pixels each of which can be likened to a square with sides of approximately 300 $\mu$m.

OBJECT AND SUMMARY OF THE INVENTION

The present invention aims to provide a document making use of the traditional qualities of the image and the text, but usable in association with data processing type storage means, this being achieved without detriment to the original image or text.

For this purpose, each index comprises a group of dots placed on the document in the vicinity of the associated elementary area and forming a specific code for the said area, the indexes as a whole forming a location frame covering the said image or the said text and superimposed thereupon, each group of dots being readable by optical reading means cooperating with a data processing system comprising a data medium that is addressable by means of the said indexes.

Each location index serves as a key giving access to information that is not provided on the document, and which may differ according to the intended use thereof and can easily be updated. In the field of geography, for example, the entire text of an appendix, all the logical and topological relationships, as well as all the calculation formulae, can be held on a data processing data medium belonging to a calculator of conventional architecture, possibly pocket-sized. The memory volume is, indeed, very small as the calculator does not have to store any of the graphics functions or the most voluminous data.

For reading purposes, the data processing medium can be addressed very simply using optical reading means which it suffices to place on the map at the location where the information is sought for. Such reading means can simply take the form of an optical wand reader having a scanning field representing 2 to 5 times, in each direction, the overall dimensions of an index. Although various encoding modes are possible, it seems to be of particular interest to use an index constituted by a rectangular block of dots printed along several rows of the same length. These rows are advantageously separated by empty rows, and it is also advantageous to encode only one out of every two pixels of the frame in a row, the intermediate pixel remaining empty. Furthermore, one out of every two blocks is left empty, the blocks of coding then forming a discontinuous frame resembling a checkerboard which facilitates the identification and decoding of the block the best centered in the scanning field of the wand reader, should several blocks appear therein.

Numerous security inks are already known which have a response, that is to say a brilliance, which is very weak when they are illuminated by visible light, and which, on the other hand, have a strong response (reflectivity or fluorescence) in a given line of the spectrum when they are illuminated by a light outside the visible spectrum, generally in the ultraviolet range. The wand reader then comprises means for locally illuminating the document by means of a light that excites the security ink and a filter designed to isolate the response wavelength of the ink.

BRIEF DESCRIPTION OF THE DRAWINGS

The invention will be more readily understood in the light of the description that follows of particular forms of embodiment, given by way of non-limitative examples, and with reference to the accompanying drawings, wherein:

FIG. 1 is a representation, on a very large scale, to bring out the frame structure, of a fragment of a conventional geographical map along a coastline (the colours cyan and yellow being represented respectively by dots containing crosses by and by empty dots).

FIG. 2 schematically shows a possible representation of code 16384 with the help of a block of $10 \times 10$ pixels, on a considerably enlarged scale.

FIG. 3 shows the representation of several figures in the "three out of five" code used for the representation in FIG. 2.

FIG. 4 shows, on an enlarged scale, a region in which the location frame has a succession of indexes in a checkerboard pattern.

DETAILED DESCRIPTION OF PREFERRED EMBODIMENTS

Figure 5:
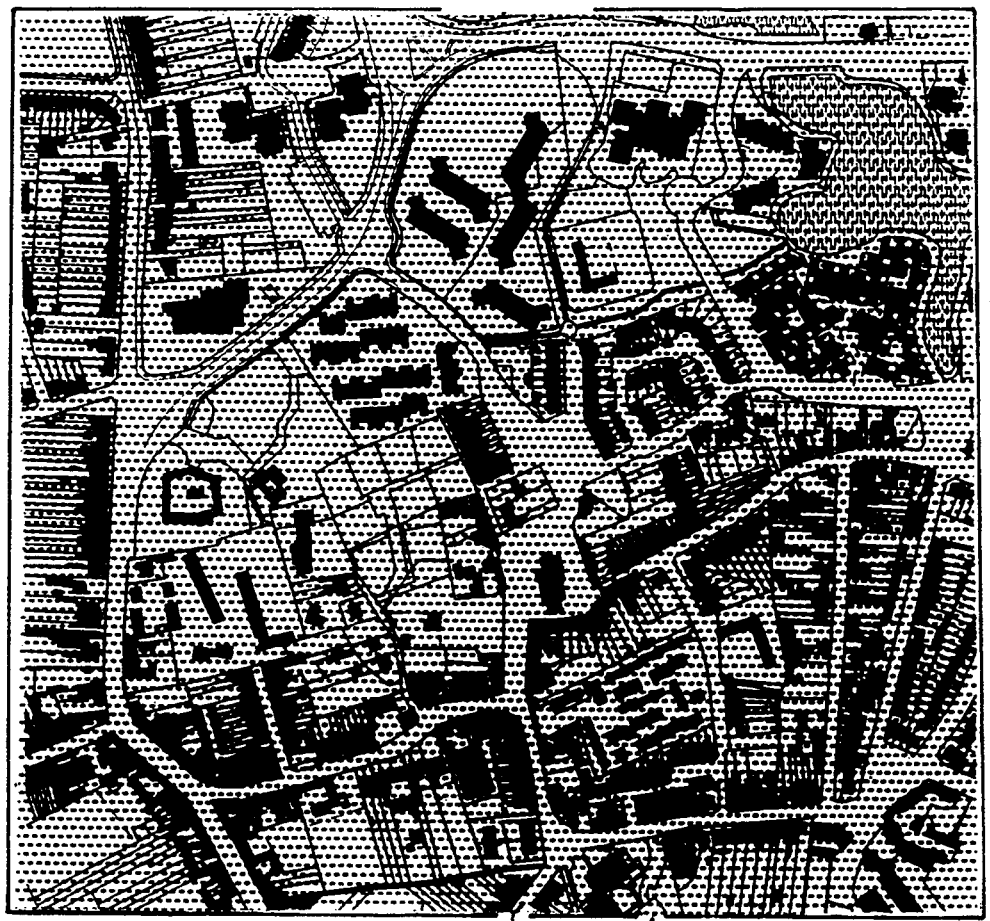
FIG. 5 represents, without any enlargement, a portion of a map on which is superimposed the location frame according to the invention.

Conventional geographical maps are composed of matrices of dots distributed according to a regular frame. In the frequently occurring case of maps produced by tetrachromy, three colour frames are used, cyan (for the areas of water), green (for the vegetation) and yellow (for the desert areas), by superimposing which additional shades can be obtained, and a black frame, in particular for the inscriptions.

In the conventional printing process, each frame takes the material form of a mask on a photographic film the transparency of which is variable according to the dots, or offset film. FIG. 1 shows, by way of example, a map fragment, considerably enlarged to bring out the dots in the frame. On one side of the coastline, in a desert area, the dots are yellow while, on the other side, they are cyan.

There are many other methods of manufacturing maps, some of these better adapted to special applications. It is possible, in particular, to print maps using an ink-jet printer or an electrostatic printer, particularly when the indications are frequently modified in order to adapt them to a particular assignment. The invention is also applicable to the case of a graphic representation that was originally continuous, but subsequently framed (an aerial photograph, for example). In the case of digital photographs obtained, for example, from airborne scanners or observation satellites and reproduced using photo-restorers, the invention is particularly applicable thanks to insertion of the location frame directly in the digital files, prior to restoration.

To implement the invention, disjoined codes formed on a frame that is superimposed on the graphic indications are superimposed on the graphic representation dots. Conventional printing processes make it possible, without any difficulty, to print dots of 50 to 100 $\mu$m in diameter located to within better than 10 $\mu$m inside a pattern. Use can be made, in particular, of a square pattern of approximately 1 millimeter $\times$ 1 millimeter formed by dots of approximately 100 $\mu$m in diameter. To facilitate identification and decoding, it is advantageous to adopt a pattern formed by rows of encoding dots separated by empty rows, each location intended for an encoding dot being separated from the adjacent locations by an empty space.

In the case contemplated above, involving a 1 millimeter $\times$ 1 millimeter pattern, this means that there are five rows available, each having five encoding locations and five spaces. Use can be made, in particular, of a binary code for identifying the figures from 0 to 9 of the "3 out of 5" type, indicated in FIG. 3, including three encoding locations 30 on which is placed a dot, and two encoding locations 31 without dots. The figures thus encoded are indicated in FIG. 3, to the left of each row.

The expression "3 out of 5" covers the opposite case in which the three locations 30 are left empty and the two locations 31 contain a dot. This code has the advantage of facilitating the location of an index, as each row comprises the same number of dots having the same radiometric value, that is to say the same light intensity in the colour in which they are represented. FIG. 2 shows such an index, 10, wherein, for each encoding row, the two empty encoding locations 31 have the same brilliance as the dots in the frame not belonging to an index and relating to the graphic representation frame of the map, whereas the encoding locations 30 containing the encoding dots are of greater brilliance. In the example given in FIG. 2, the index 16 384 is represented on a pattern with five "active" rows and five locations per row. Five rows per pattern suffice to encode 100 000 positions.

The index in FIG. 2 is thus constructed on the basis of an elementary matrix of pixels composing a matrix of larger dimensions, which forms the photosensitive face of an optical wand reader, the dots disposed on the elementary matrix forming a binary code of certain active pixels in this matrix.

It will be noted that the square index in FIG. 2 is substantially isotropic, dots 30 being distributed approximately in all directions about a centre of the index, which is also apparent from observing the different indexes 10 in FIG. 4; this arrangement permits quasi punctual encoding of a map. Conversely, an index having a form as anisotropic as a line of dots, would be less appropriate for the desired encoding. More generally, a matrix comprising a similar number of lines and columns will be considered as substantially isotropic.

Figure 6:
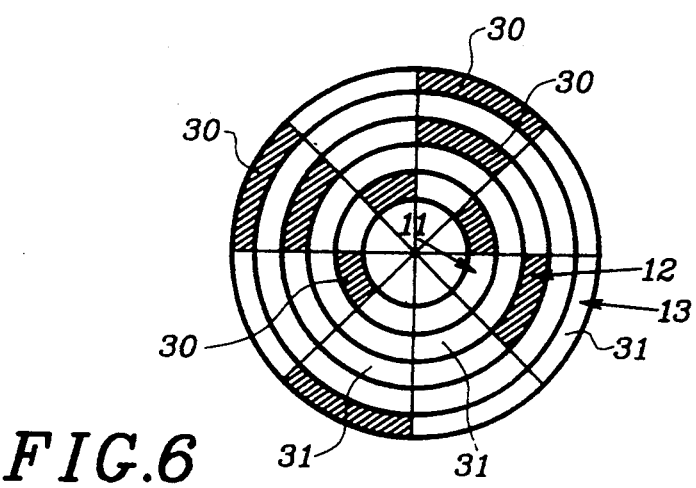
FIG. 6 is a variant of FIG. 2.

Another example of an isotropic index is represented in FIG. 6, where the active "rows" are, here, concentric circles 11 to 13, separated from one another by inactive circles, dots 30 and blanks 31 corresponding to those in FIG. 2 being identified.

It will be noted that the density of the dots on the index in FIG. 2 is low, as it comprises fifteen dots for one hundred pixels. This choice contributes to making the location frame on the map difficult to see with the naked eye. More generally, "low density" should be taken as meaning a density of less than 20 dots for one hundred pixels in the case of an encoding frame that is visible to the naked eye, and of less than 50 dots for one hundred pixels in the case of an encoding frame that is invisible to the naked eye.

If a security ink, not visible to the user, is employed, the appearance of the map is not impaired; the indexes are easy to isolate using a reader; each index can be superimposed directly on the dot to which it relates.

In those areas of the map in which the different indexes are very numerous, each index can be printed once only exactly at the point concerned. In most cases, the blocks encode the pair of cartesian coordinates of their location; thus all the blocks in the location frame indicate a different code.

To facilitate further the identification and decoding of the pattern best centered in the scanning field of the optical reading means, it is possible to incorporate in the frame only one block out of two and to arrange the incorporated blocks after the fashion of a regular rectangular checkerboard, as shown in FIG. 4. The blocks can further be indexed by adopting, as a block indexing scheme, a curve having the property of filling the entire square and thus of permitting the definition of a dot with a single parameter. Among such curves, mention can be made, in particular, of Hilbert's curve, a description of which is to be found in the article entitled "Fractals et dynamique des itérations" (Fractals and the dynamics of iterations) by Claude BREZINSKI, AFCET-/INTERFACES No. 88, February 1990, page 3.

It will be noted that the arrangement of the dots of the index in FIG. 2 in rows and columns facilitates identification, as these define two orthogonal directions, x,y (FIG. 4), enabling the map to be orientated about the index in question. What is more, the arrangement of the indexes in relation to one another can also provide this identification: the checkerboard arrangement of indexes 10 in FIG. 4 again defines the two orthogonal directions, x, y.

The data processing means associated with the map comprise a mass memory containing a data base and addressable by means of the index, a processing unit enabling the data base to be consulted using an input means such as a keyboard, and an alphanumeric display means. Addressing to obtain information corresponding to a given index is carried out by means of opto-electric means such as a wand reader with a matrix of charge coupled sensors having a field the diameter of which generally corresponds to about three times the dimension of the pattern. When the patterns are of the special constitution described above, the wand reader can have a field of 5 millimeters in diameter and comprise focusing optics and a CCD camera. The processing unit is programmed so as to carry out simple morphological processing for individualizing and then decoding the index. The processing unit can be supplemented by an interface linking up with a global positioning system receiver, now available on the market, and enabling the position of the receiver to be determined to within ten or so meters, with reference to the position of twenty-four satellites in orbit.

The processing unit can be designed in order to permit the addressing of data in the memory by means of keywords or standard questions, so as to make it possible to read the answers to questions, even complex ones, such as:

the number of hotels in the town indicated by the index at which the wand reader is pointed, towns with over five thousand inhabitants at less than one hundred kilometers by road in the administrative region at the police headquarters of which the wand reader is pointed, direction to take from the location pointed to on the map to go to another location, also pointed to on the map, where the data is obtained via the keyboard.

By using a security ink, which has no reponse in the visible range, the indexes can be printed on the map without impairing legibility or adversely affecting location. These advantages are of little interest in the case of homogenous areas on the map, such as areas of sea. In these spaces, identified by a cyan frame, the indexes can be printed, repetitively or otherwise, using markings provided on the cyan frame, in place of those inscribed in security ink, or in addition thereto, for example to provide specifically nautical indications, such as bathymetrical information. More generally, on a map having a background formed by a photographic image, it suffices for the frame to take the form of a simple photographic insertion in a shade which, if it is visible, interferes as little as possible with the viewing of the image.

The maps required for implementing the invention can be manufactured using a wide variety of processes, from which a choice will be made according to the application concerned.

These applications can be placed in three broad categories.

For professional applications, such as the preparation of an assignment, which generally necessitate a map provided with information proper to each particular assignment, the map can be prepared immediately prior to the assignment, with the help of an ink-jet printer, for example, using information required for the assignment retrieved from a data base, this data base being stored in a semi-conductor memory.

The map can either be produced by inscribing the indexes, using a security ink-jet printer, on an existing map, or made up in a simplified form by retrieving data from the existing map (constituted on the basis of data such as that provided by the National Geographical Society, the Naval Hydrographic Service, the National Forestry Department, etc.), edited with the location frame using an ink-jet printer in several passes.

For semi-professional applications, for example for navigators, the data does not need to be prepared for a particular assignment but distributed according to geographical areas. In this case, the map simply needs to be provided with indexes. The associated data processing means will form, in particular, the equivalent of nautical instructions, almanachs providing information on the tides, etc. A link-up with a global positioning system, or GPS, is of particular interest in this application.

Finally, the popular applications are all connected with touring and transport: they will enable the publishers of maps, guides and plans to substitute data processing means for books and, what is more, they will make it possible to reduce the diversity of maps and to develop the variety of information on a theme by theme basis, for example by providing data bases devoted to road traffic, historic monuments, points of sale, hotels, etc.

In this case, the maps can be manufactured using entirely conventional methods, except that editing necessitates a fifth offset film, this being required for printing the indexes in security ink.

One full sized example of a framed map according to the invention is shown in FIG. 5, which shows a land register map. The location frame, which is superimposed on the cartographic markings, formed in particular by streets, the contours of plots of land, and houses, is composed of indexes 10 disposed checkerboard fashion and uniformly covering the entire map, each one appearing, to the naked eye, as a single dot.

Figure 7:
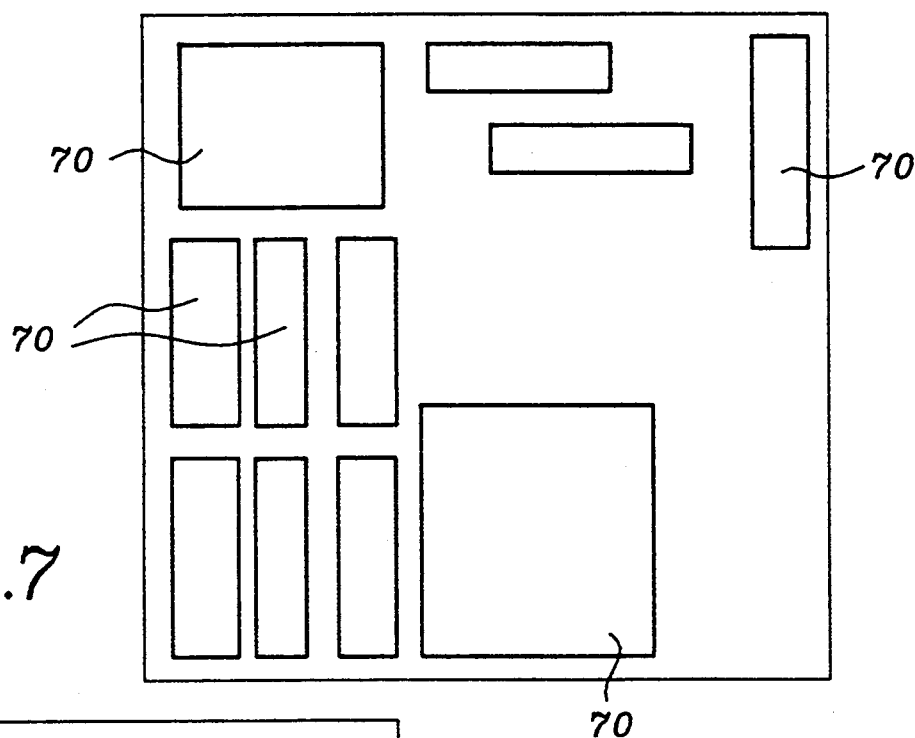
FIGS. 7 to 9 illustrate the following: the first, an electronic circuit board bearing a number of integrated circuits; the second, a page of a catalogue showing articles for sale; and the third, a landscape, these three figures being intended to receive the location frame according to the invention.
Figure 8:
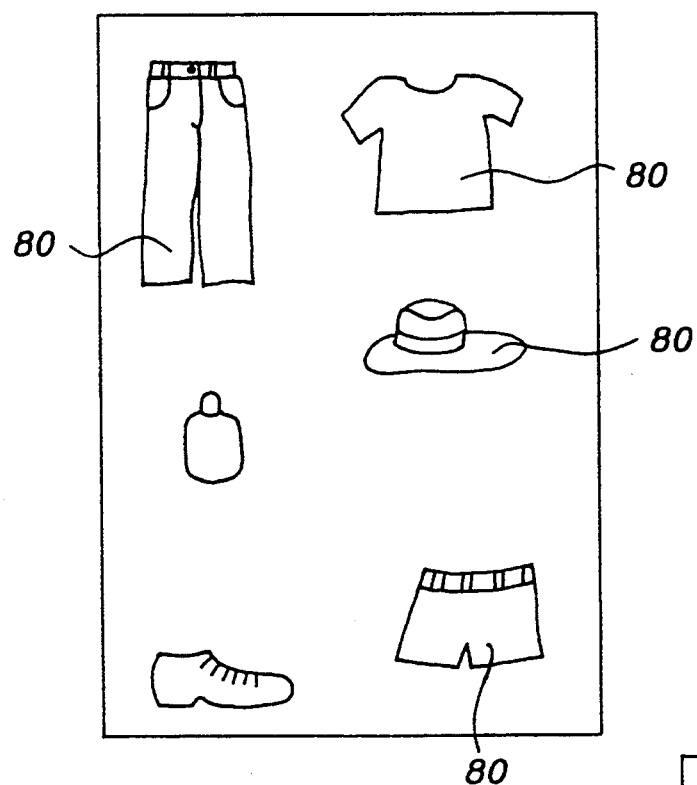
Figure 9:
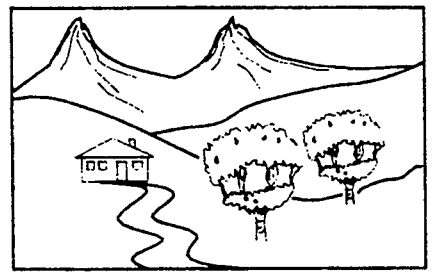

FIGS. 7 to 9 relate to applications of the invention wherein the image to be encoded does not concern cartographic information. FIG. 7 represents the image of an electronic circuit board bearing a number of integrated circuits 70 distributed over its surface, each circuit taking the form, in a manner known per se, of a block of small dimensions bearing a large number of electrical connection pins, not shown in the figure, which pass through the circuit board to be connected at different points on a printed circuit or conducting track borne on the opposite face of the circuit board.

The nomenclature of the equipment on such an electronic circuit board, even if very exhaustive, is easily accommodated in the memory of a pocket calculator; it is even possible to contemplate storing the nomenclature of a whole series of such sub-assemblies.

On the other hand, layout and routing drawings (connections are made over several layers of printed circuits) make disk storage absolutely essential, and they can be displayed only very partially on a liquid cristal screen.

It is therefore proposed to use simple photographs of the circuit boards, which further have the advantage of complete conformity with the product, and to supply only the nomenclatures and connections in digital form. For this purpose, a location frame according to the invention is applied to the photograph of the circuit board. As the integrated circuits are widely spaced, by comparison with the geographical information in FIG. 5, the density of the indexes may be low. On each circuit, the index associated therewith will advantageously be repeated a certain number of times so as to cover all the visible surface thereof, and thus ensure identification of the circuit, even if the wand reader is not placed at a precise point on its surface.

Full information on a particular circuit is obtained by pointing to it with a wand reader on the photograph.

The first application of the process is field maintenance: all the maintenance man takes with him is a set of images, a pocket calculator and the wand reader; he can also record the details of his visit on the local card of the circuit in question.

It is also conceivable for a supplier to use this process to make up an exhaustive, but very compact catalogue of his products.

FIG. 8 represents a page of a sales catalogue with drawings or photographs of articles 80 such as garments or other common consumer goods. Unlike the examples in FIGS. 5 and 7, the positions of the items 80 to be identified on the page or photograph are random: the location frame according to the invention is simply intended to associate with each article the information that the consumer needs in order to make his or her choice (description of the article, price, ordering and delivery procedures, etc.). The frame will be designed here in the same way as in the case of FIG. 7.

As a variant of FIG. 8, the frame according to the invention can be applied to a page of an illustrated encyclopedia, to associate legends of a scientific, artistic or literary nature with photographs or drawings presented on the page.

FIG. 9 shows a landscape in the form of a drawing, a painting, a photograph or any other means of image creation. This landscape is intended to receive a dense index frame enabling a particular item of information to be associated with each elementary area of the landscape. If this landscape serves an artistic purpose, the information may consist, for example, of specific indications concerning the colour of the elementary area in question, informing the painter of the nature and proportions of the basic colours to be mixed.

Another case is that in which this landscape faithfully represents a geographically determined site. In the fields of tourism, education or industry, the frame will provide a legend associated with each building, feature of relief, lake, etc. visible on the image. In another application such as engineering, the image could consist of a photograph of all or part of an industrial installation such as an oil refinery.

The invention also applies to the encoding of a text, one or more indexes being allocated to each word in the text concerned. Different applications could include automatic translation, in a given language, of the word pointed to by the wand reader, while another could be the use of a computerized dictionary to provide the definition of a word pointed to by the wand reader.

I claim:

1. Document bearing an image or a text, said image or text being divided into a large number of elementary areas, each of said areas having an index associated therewith, each index including a group of dots placed on the document in the vicinity of the associated elementary area and constituting a specific code for said area, the indexes as a whole forming a location frame covering said image or said text and being superimposed thereupon, each group of dots being readable by optical reading means cooperating with a data processing system comprising a data medium addressable by means of said indexes and containing information specific to the associated areas.

2. Document according to claim 1, designed to be read by optical reading means including an ordered matrix of pixels, each group of dots forming each said index comprising an elementary matrix of pixels distributed in a substantially isotropic manner, the dots in said group of dots being distributed over certain of the pixels in said elementary matrix so as to permit binary coding of each of them.

3. Document according to claim 2, wherein only certain pixels in said elementary matrix have an encoding dot, said certain pixels being separated from one another by at least one pixel without encoding dot.

4. Document according to claim 3, wherein only a small number of said encoded pixels has an encoding dot.

5. Document according to any one of claims 1, 2, 3 or 4, wherein the dots in each group of dots are disposed in relation to one another so as to define a reference system which comprises two orthogonal directions and is unique for the whole of the location frame.

6. Document according to claim 2, wherein said elementary matrix is formed by several rows and several columns of pixels.

7. Document according to claim 6, wherein certain of said rows or columns of pixels define said index, each row or column having dots distributed so as to form a code of the "3 out of 5" type representing a figure from 0 to 9.

8. Document according to claim 1, wherein the different groups of dots in the location frame are disposed in relation to one another so as to define a reference system comprising two orthogonal directions.

9. Document according to claim 8, wherein the different groups of dots are arranged after the fashion of a checkerboard.

10. Document analysis system including a document according to claim 1, further comprising an optical wand reader having a scanning field covering several juxtaposed indexes, and an illumination means having a given wavelength, for discrimination between said location frame and said image or said text.

11. Document analysis system according to claim 10, further comprising a data processing system including a data medium addressable by means of said indexes and containing information specific to the associated areas.

* * * * *